(12) United States Patent
Leis

(10) Patent No.: US 8,154,238 B2
(45) Date of Patent: Apr. 10, 2012

(54) ACCURATE AND VERSATILE BACK EMF SENSOR

(75) Inventor: Michael Leis, Framingham, MA (US)

(73) Assignee: Seagate Technology LLC, Cupertino, CA (US)

( * ) Notice: Subject to any disclaimer, the term of this patent is extended or adjusted under 35 U.S.C. 154(b) by 525 days.

(21) Appl. No.: 12/399,436

(22) Filed: Mar. 6, 2009

(65) Prior Publication Data

US 2010/0225265 A1     Sep. 9, 2010

(51) Int. Cl.
*G05B 13/00* (2006.01)
(52) U.S. Cl. ............... 318/561; 318/400.1; 318/400.42
(58) Field of Classification Search ............ 318/561, 318/400.1, 400.42, 801, 362, 762, 805, 800, 318/560
See application file for complete search history.

(56) References Cited

U.S. PATENT DOCUMENTS

| | | | |
|---|---|---|---|
| 6,369,538 B1 * | 4/2002 | Youn et al. ............ | 318/362 |
| 6,388,417 B1 * | 5/2002 | Keith ..................... | 318/701 |
| 6,560,059 B1 * | 5/2003 | Hsin et al. ............. | 360/78.04 |
| 6,940,685 B2 | 9/2005 | Soldavini et al. | |
| 2005/0134562 A1 * | 6/2005 | Grant et al. ............ | 345/161 |
| 2009/0138130 A1 * | 5/2009 | Aigner et al. .......... | 700/282 |

* cited by examiner

*Primary Examiner* — Karen Masih
(74) *Attorney, Agent, or Firm* — David K. Lucente

(57) ABSTRACT

A filter representing a complex impedance of a motor system based on a deviation between a first voltage driven by a command signal and a second voltage driven by the command signal can be dynamically adjusted. The motor system can be held in a steady state, eliminating back electromotive force, by providing zero mean current excitation.

20 Claims, 6 Drawing Sheets

ACCURATE AND VERSATILE BACK EMF SENSOR

SUMMARY

Some storage devices, such as magnetic and optical disc drives, utilize direct current (DC) motors such as voice coil motors (VCMs) to quickly and accurately position the read-write head of the storage device. During the operation of a DC motor, when a coil in the motor is powered, a magnetic field develops around an armature, this field reacts with another magnetic field and the armature rotates. The spinning of the motor generates a voltage known as a counter electromotive force (CEMF) or back electromotive force (BEMF). The voltage generated across the motor is that resulting from the BEMF plus the voltage across the motor impedance caused by the armature current. When the motor is held at zero velocity, the BEMF is zero, and the only voltage generated across the motor is that resulting from the resistive, capacitive, and inductive effects of the motor coil. By measuring the voltage across the motor and the motor armature current ($I_A$) when the motor is held at zero velocity, the impedance of the motor armature ($Z_A$) may be calculated. Once the armature impedance is calibrated, BEMF may serve as a feedback control mechanism to control velocity while the motor system is running.

Implementations described and claimed herein provide for a method and system for dynamically adjusting a matching filter to compensate for the impedance effects of a DC motor, so that back electromotive force may be measured accurately. Further, implementations described herein present a method for placing a DC motor in an equivalent "zero-velocity" steady-state without mechanically stopping the motor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. It should also be understood that, although disc drive implementations are described here, the described technology may be applied to other systems using DC motors.

BRIEF DESCRIPTIONS OF THE DRAWINGS

FIG. 1 illustrates an exemplary system for sensing the BEMF of a monitored device, and dynamically adjusting a filter to compensate for the impedance of the monitored device.

FIG. 2 schematically illustrates an exemplary system used to operate a motor using BEMF as feedback control measurement.

DETAILED DESCRIPTION

A disc drive is a data storage device used to store digital data. A typical disc drive includes a number of rotatable recording discs (i.e., storage medium discs) that are axially aligned and mounted to a spindle motor for rotation at a high rotational velocity. A corresponding array of read/write heads access tracks defined on the respective disc surfaces to write data to and read data from the discs. These read/write heads are positioned using voice coil motors (VCMs), which are a type of DC motor. A disc drive would typically control the position and velocity of the VCM by other means, but during certain emergency conditions BEMF is used instead. Although certain implementations are described herein in the context of disc drives, the described technology may be employed in other non-disc-drive systems as well.

One implementation of the described technology introduces a back electromotive force (BEMF) sensor used to measure the velocity of the VCM. The BEMF sensor dynamically adjusts a filter to compensate for the impedance of the coil of the motor while the motor is otherwise in normal operation. The BEMF measured can serve as the feedback control mechanism to control velocity. However, the impedance of the coil of the motor is temperature and position dependent. Thus, it is desirable to determine the impedance of the coil of the motor under operating conditions, so that the BEMF can be accurately determined.

Figure 1:
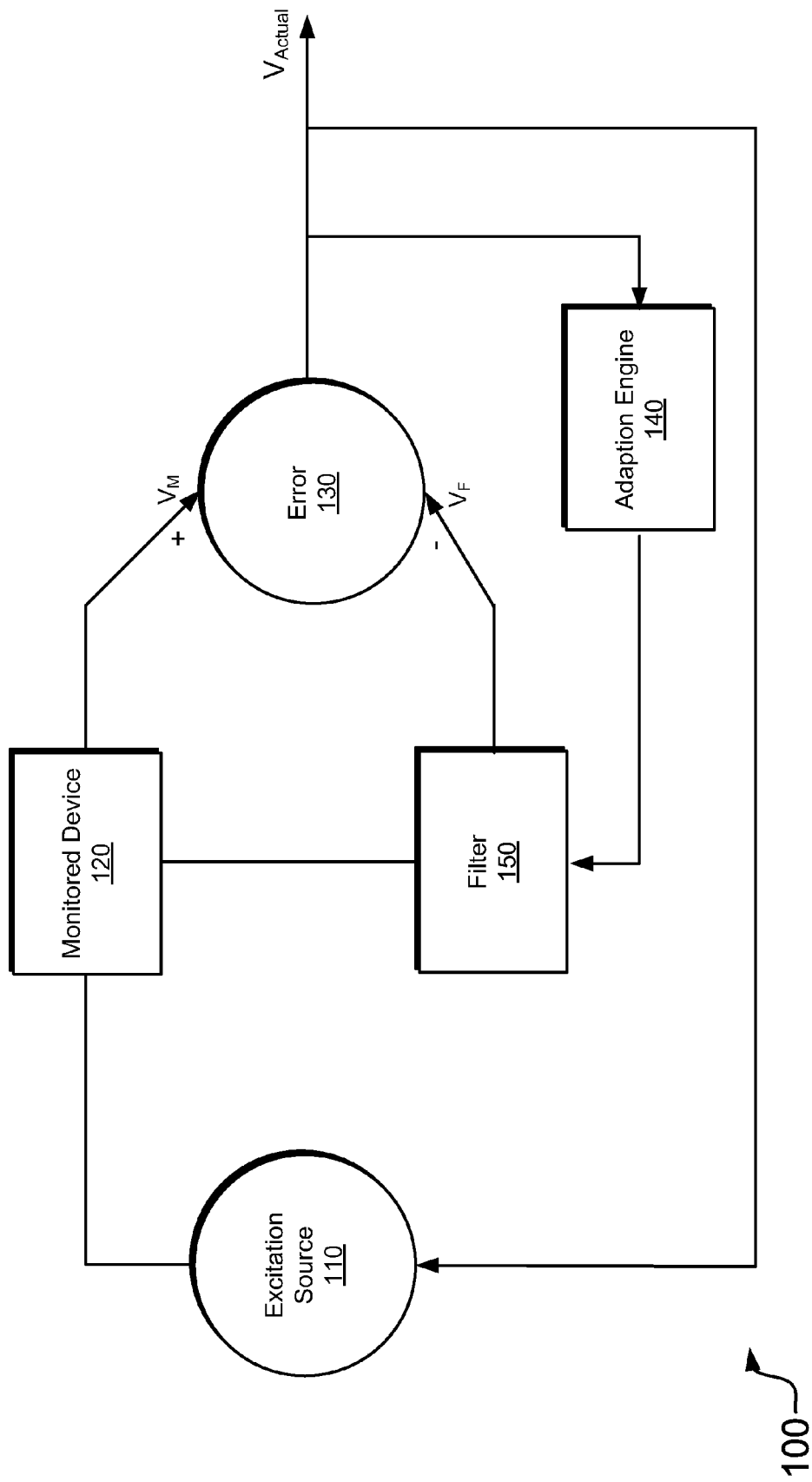

FIG. 1 illustrates an exemplary system 100 for sensing the BEMF of a monitored device 120, and adapting a filter 150 to match the impedance of the monitored device and then using this filter to compensate for the device 120 impedance. The monitored device 120 may be, for example, a type of motor, such as a voice coil motor (VCM) or other DC motor.

In the illustrated implementation, an excitation source 110 is used to apply an excitation signal to a monitored device 120, such as a VCM in a disc drive, while the monitored device is held fixed or at a steady state. The excitation signal 110 is also applied to a filter 150, such as a finite impulse response (FIR) filter, or any other type of filter. In the implementation shown, the excitation signal applied to the monitored device 120 and the filter 150 is a velocity command. In other implementations, however, the excitation signal applied may be a voltage signal. When the excitation signal is applied to the system 100, the monitored device 120 generates an output signal $V_M$ that may be measured using, for example, a voltage detection circuit (not shown). Similarly, the filter 150 modifies the applied excitation signal in accordance with the design of the filter, generating an output signal $V_F$ that may be measured using, for example, a voltage detection circuit (not shown).

Once the output signals $V_M$ and $V_F$ of the monitored device 120 and the filter 150, respectively, have been measured, an error module 130 determines the difference between the output signals. The error module 130 may be, for example, an operational amplifier ("op-amp"). The difference in value between the output signals may also be referred to as the error, and reflects the accuracy with which the filter 150 models the impedance of the monitored device 120. When the difference between the output $V_M$ of the monitored device 120 and the output $V_F$ of the filter 150 is zero, the monitored device 120 and the filter 150 affect the excitation signal in the same way and the filter 150 is said to be "matched" to the monitored device 120. An error value that is not zero indicates that the filter 150 does not accurately model the monitored device and, thus, it is necessary for an adaption engine 140 to adapt the filter 150 until the error value is zero.

When the difference between the output $V_M$ of the monitored device 120 and the output $V_F$ of the filter 150 is not zero, the difference or error is fed back to an adaption engine 140, which uses the error value to tune or adapt the filter 150. Additionally, the adaption engine 140 may adapt the filter 150 based on the state of the system 100 and the monitored device 120. Thus, the adaption engine 140 may account for changes in the system and adapt the filter 150 to effectively cancel the effects of those changes.

In an implementation, the adaption engine 140 may include a filter, such as a band bass filter or a high pass filter, which would allow sensing at specific frequencies and which can be used to minimize the effects of random events or noise that may be present in the difference signal out of the error detector 130.

With each subsequent application of an excitation signal to the system 100, the filter 150 will be adapted by the adaption engine 140 to reduce the resultant error between output voltage $V_M$ of the monitored device 120 and the output $V_F$ of the filter 150. When the filter is matched the adaption can be stopped and a signal, $V_{actual}$, can be used as an indication of the state of the Monitored Device 120.

Figure 2:
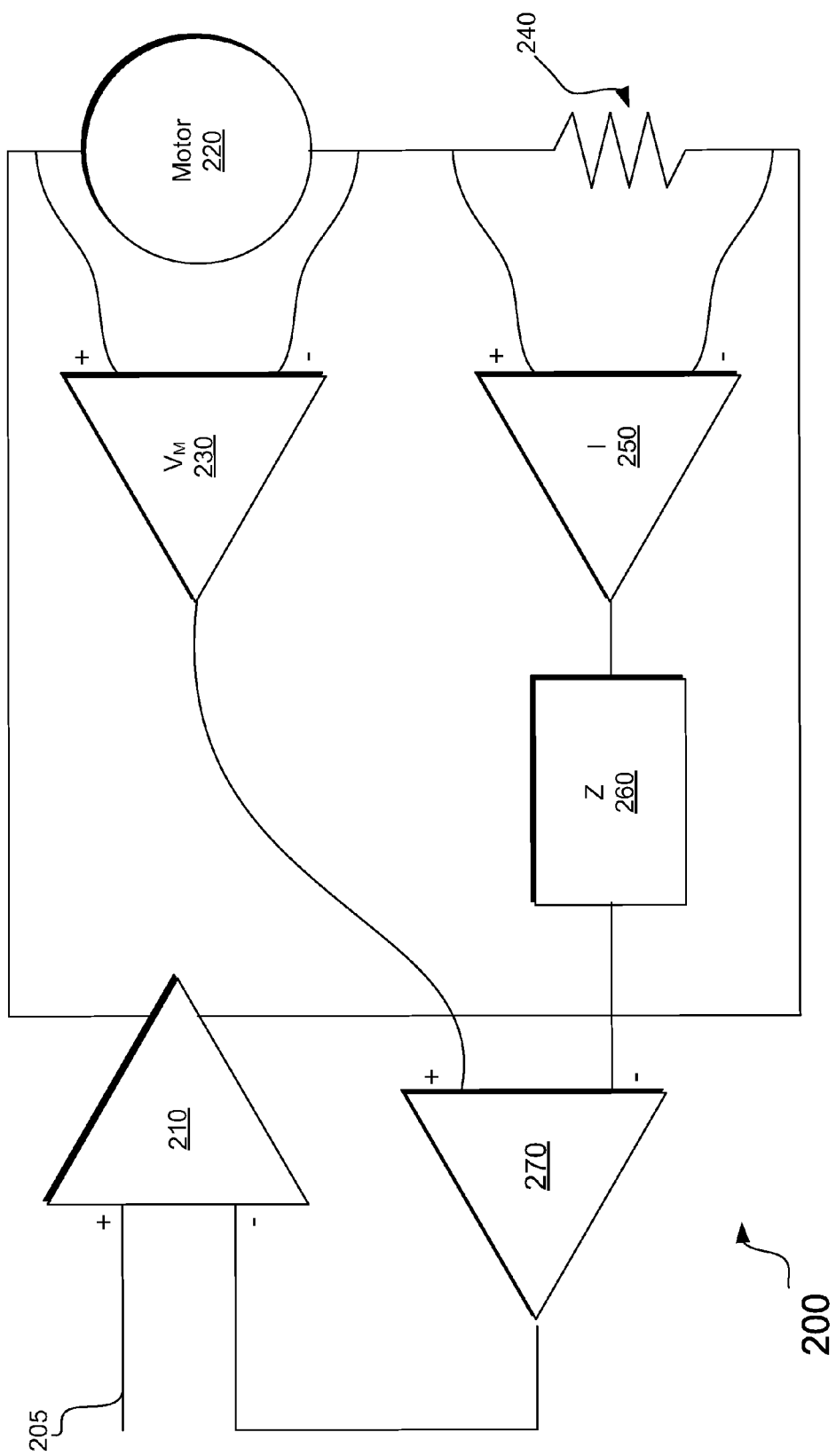

FIG. 2 schematically illustrates an exemplary system 200 used to operate a motor using the BEMF signal. The BEMF signal is supplied out of amplifier 270 as the feedback signal of actual motor 220 operation. In system 200, the voltage across motor 220 can be described by the equation $V_M = V_{BEMF} + I_A \cdot Z_A$, where $V_M$ is the voltage across the motor 220, $I_A$ is the armature current, $Z_A$ is the impedance of the motor, and $V_{BEMF}$ is the BEMF generated by the motor. A resistor 240 is used to sense the motor 220 armature current. The signal out of amplifier 250 will be proportional to the armature current. When the filter Z 260 is adapted correctly to be equal to Armature impedance $Z_A$, the signal out of the filter Z 260 will be equal to the $I_A \cdot Z_A$. This signal out of the filter 260 is subtracted from the signal across the motor, Vm, by amplifier 270. The resulting signal out of amplifier 270 is then $V_{BEMF} + I_A \cdot Z_A - I_A \cdot Z_A = V_{BEMF}$. This signal out of amplifier 270 will represent the motor velocity without any interference from the motor armature current and impedance and will be subtracted from the motor velocity command 205 to develop the drive signal to the motor 220 necessary to force the motor velocity, and $V_{BEMF}$ to match the velocity command 205.

Tuning the Filter 260 is accomplished in the implementation shown in FIG. 2 when a known command signal 205, such as a high frequency with zero-mean value, called a tickle, is applied to the motor 220. Alternatively, the motor may be mechanically fixed while a known command signal, such as a voltage command signal or a current command signal, is applied to the motor.

While the known command signal or applied voltage 205 is applied to the system, the voltage across the motor, $V_M$, is measured. As illustrated in FIG. 2, the voltage across the motor $V_M$ may be measured using an operational amplifier 230, which measures the voltage at each of the terminals of the motor 220 and then determines the difference between the voltages measured at each of the terminals of the motor 220. Because the motor 220 is being held at a steady state while the known command signal 205 is applied, no BEMF voltage is generated by the motor. Thus, the voltage across the motor is equal to the product of the armature current $I_A$, which can also be measured, and the armature impedance of the motor $Z_A$.

As shown in FIG. 2, in system 200, a resistor 240 is placed in series with the motor 220. The resistance R of resistor 240 is known. When the known command signal 205 is applied to the system 200, the voltage across the resistor 240 is measured using operational amplifier 250. Ohm's Law, I=V/R, can then be used to solve for the armature current $I_A$ by dividing the voltage measured across resistor 240 using op-amp 250 by the known resistance R of resistor 240.

The armature impedance of the motor, $Z_A$, is generally unknown, and is modeled by a filter 260. However, when the motor 220 is mechanically stopped or held at a steady state using a tickle signal, the impedance can be determined by solving the equation $V_M = I_A \cdot Z_A$ for $Z_A$. Thus, $Z_A = V_M/I_A$. By solving for the armature impedance $Z_A$ while holding the motor 220 at a steady state, an accurate value for the armature impedance can be determined, even when the armature impedance is complex in nature.

Figure 3:
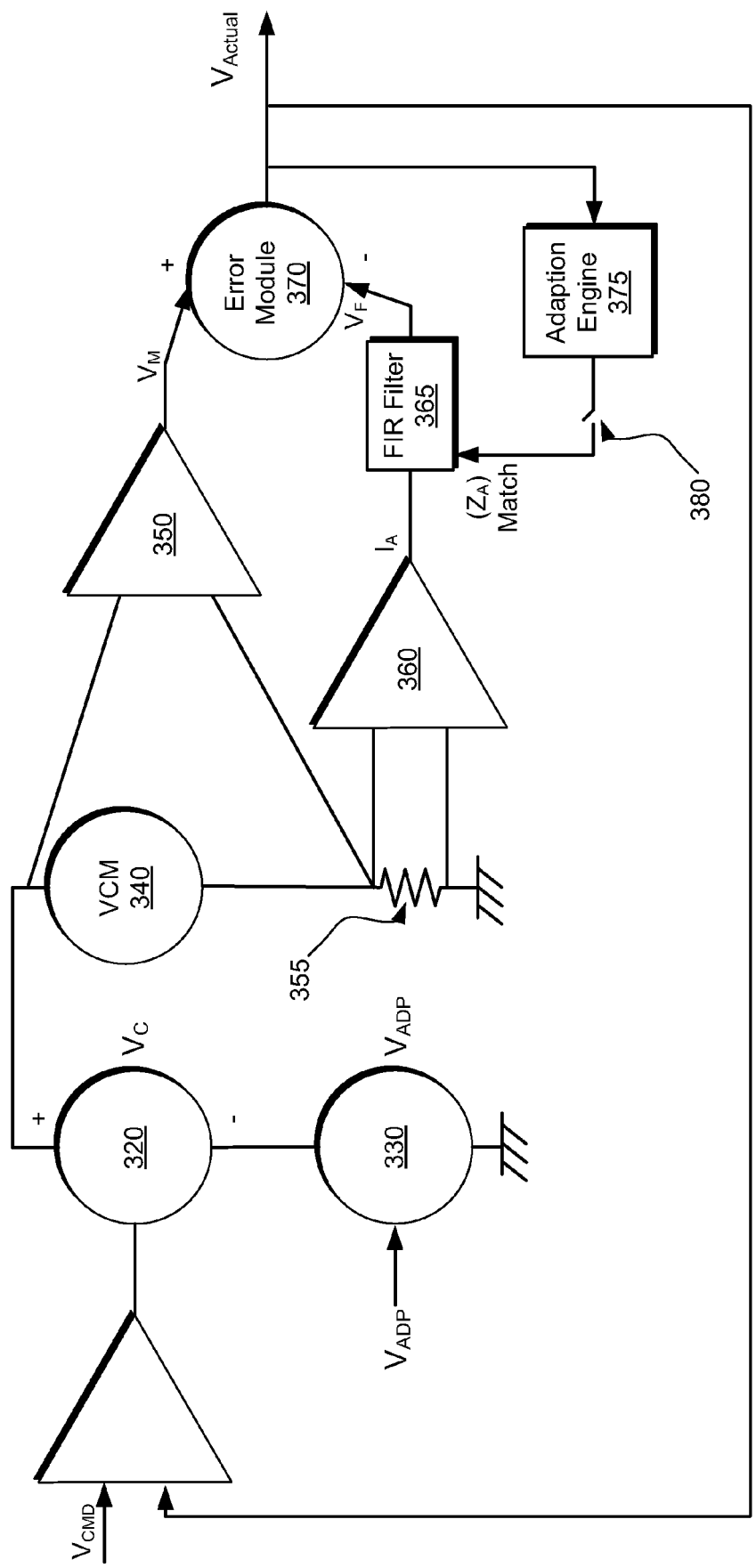
FIG. 3 illustrates an exemplary BEMF Sensor system for dynamically adjusting a filter based on the voltage across and the current through a voice coil motor (VCM) 340.

FIG. 3 illustrates another exemplary motor system 300 for dynamically adjusting a filter based on the back electromotive force (BEMF) of a voice coil motor (VCM) 340. In FIG. 3, a velocity command, $v_{CMD}$, is used to drive the motor system 300. Application of an adaption voltage $V_{ADP}$, such as a zero-mean high-frequency excitation signal, to the system 300 may occur, for example, between read/write operations, and does not disturb operating state of VCM 340. When VCM 340 is held at a steady state, whether by mechanically constrained to be at zero velocity by, for example, by having the arm rest against the mechanical limits of travel, or by applying a tickle signal, very little to no BEMF develops. When there is no BEMF contribution to the voltage across the motor, the model of the voltage across the motor as a function of the command signal should be a model of the desired cancellation error voltage due to armature impedance.

When switch 380 is open (and no feedback from the adaption engine is used) and $V_{ADP}$ 330 is zero, FIG. 3 illustrates a system similar to that shown in FIG. 2. The filter 365 operates in a similar manor to the element 260 in FIG. 2. With switch 380 open and $V_{ADP}=0$, the system 300 operates as a well understood BEMF controlled servo system as illustrated in FIG. 2. When the velocity command $v_{CMD}$ is applied to servo 310, the servo causes a voltage $V_C$ to be applied to the motor system by voltage source 320. An adaption voltage (or current) $V_{ADP}$ may also be applied to the system by source 330. In an implementation, the adaption voltage/current may be high frequency in comparison to mechanical time constants of the motor. The sum in voltages between the adaption voltage $V_{ADP}$ and the command voltage $V_C$ is applied to the VCM 340, and the voltage $V_M$ across the VCM 340 is measured using an operational amplifier ("op-amp") 350 or other voltage measuring device. A current sensing resistor ($R_{Sense}$) 355 in series with VCM 340 and an op-amp 360 measures the armature current $I_A$ of the motor. The armature current $I_A$ of the motor is applied to a finite impulse response (FIR) filter 365. The difference between the voltage across the motor $V_M$ and the output voltage of the FIR filter $V_F$ is determined by error module 370.

When switch 380 is closed, the system 300 can determine the armature impedance ($Z_A$) of a VCM 340 and tune a filter 365 to match this impedance $Z_A$. The voltage across VCM 340 can be described by the equation $V_M = V_{BEMF} + I_A \cdot Z_A$, where $V_M$ is the voltage across the VCM 340, $I_A$ is the armature current, $Z_A$ is the impedance of the VCM, and $V_{BEMF}$ is the BEMF generated by the VCM. When the VCM 340 is held at zero velocity, no voltage is generated by the VCM and $V_{BEMF}=0$. Thus, when the VCM 340 is held at zero velocity, the voltage across the VCM is equal to the product of the armature current $I_A$ and the armature impedance $Z_A$. This signal, $V_M$, is fed to error module 370. Amplifier 360 and sense resistor 355 are used to measure armature current $I_A$. This signal is passed through an adaptable filter 365 to develop the voltage of the filter, $V_F$. This signal $V_F$ is fed to error module 370 and is subtracted from $V_M$ to develop an error signal $V_{actual}$. This error signal $V_{actual}$ is equal to $I_A \cdot Z_A - I_A \cdot$Filter, and if Filter matches $Z_A$, then $V_{actual}=0$. When $V_{actual}$ is not zero and with switch 380 closed, this error signal will be used to adapt the filter 365 to force this error signal $V_{actual}$ to zero. After this adaptation, FIR filter 365 will match the armature impedance of VCM 340.

The VCM 340 can be held at zero in a variety of ways. For example, the VCM 340 may be mechanically fixed or stopped by clamping the VCM or forcing a disc drive positioner against a mechanical stop. However, mechanically fixing or stopping the motor may be undesirable because stopping a motor will remove or delay it from normal product operation and will change the conditions in the system such as the VCM temperature, which may affect the armature impedance of the VCM. Additionally, mechanically fixing or stopping the VCM may cause vibrations known as jitter. The VCM 340 may also be held at a steady state while continuing to operate normally by applying a zero-mean excitation signal 330, $V_{ADP}$, or "tickle" to the VCM 340. The zero mean excitation signal may be, for example, a low-amplitude, high frequency, alternating positive and negative current signal or a low-amplitude, alternating positive and negative voltage signal. The frequency of the tickle will be high enough to be above the mechanical response time of the VCM and its load but low relative to the electrical response of the VCM armature. The tickle essentially does not cause mechanical motion of the VCM 340, emulating the mechanical fixation or stopping of the VCM 340 while maintaining the motor in normal operation and at operating temperature. This steady state results because the alternating positive and negative, low amplitude high-frequency excitation generates a net torque of zero due to the tickle $V_{ADP}$ (no net torque).

The tickle signal $V_{ADP}$ allows for the VCM 340 to be simultaneously operated in a BEMF feedback servo or a hard-drive positioner servo system since the tickle signal will have minimal effect on VCM 340 motion. Additionally, the application of a tickle signal $V_{ADP}$ to the VCM 340 minimizes the effects of jitter, which would normally be experienced in mechanically stopping the VCM 340, because the VCM 340 is not fixed or pushing against a mechanical stop The voltage across the VCM 340 is $V_M = (V_{BEMF} + I_A \cdot Z_A) + (V_{TBEMF} + I_{TA} \cdot Z_A)$, where $I_A$ is the armature current, $Z_A$ is the impedance of the VCM, and $V_{BEMF}$ is the BEMF generated by the VCM in the normal operation, $I_{TA}$ is the armature current due to tickle $V_{ADP}$, and $V_{TBEMF}$ is the BEMF component generated by motion due to tickle $V_{ADP}$. Since tickle $V_{ADP}$ does not cause significant VCM motion, then $V_{TBEMF} = 0$. The Adaption Engine 375 (and its filter) is constructed to be sensitive to the frequencies of the excitation $V_{ADP}$ and will ignore the VCM voltage term due to normal operation, $(V_{BEMF} + I_A \cdot Z_A)$, out of Error Module 370. The Adaption Engine 375 will sense the component $V_M$ equal to $I_{TA} \cdot Z_A$. The Error Module 370 output $V_{Actual}$ will be = $(I_{TA} \cdot Z_A) - (I_{TA} \cdot \text{FIR filter})$. The Adaption Engine 375 will then adapt the FIR filter 365 transfer function to match $Z_A$ by driving $V_{Actual}$ to become zero.

If an error value other than zero is determined between $V_C$ and $V_F$, the adaption engine can compute the armature impedance Z of the VCM 340, as discussed in FIG. 2. The adaption engine 375 then adapts the FIR filter 365 or any other appropriate filter to model the armature impedance value $Z_A$. In an implementation, the FIR filter 365 may be adapted incrementally, as part of an iterative process, by repeatedly or continually applying a zero-mean excitation signal and adapting the filter until the deviation between $V_C$ and $V_F$ is zero or within an acceptable tolerance. The motor system 300 may include a switch 380 to allow the motor system to "run" without adapting the FIR filter 365 or to adapt the filter. When switch 380 is closed and set to adapt FIR filter 365, the armature impedance $Z_A$ determined by the adaption engine is fed back to the FIR filter 365 so that the filter can be dynamically adjusted.

When the switch is in the open position, the motor system 300 runs without adapting the FIR filter 365, the adaption voltage $V_{ADP}$ is zero, and the impedance of the FIR filter 365, $Z_{FIR}$, is equal to the armature impedance $Z_A$. Thus, the actual velocity of the motor $v_{Actual} = V_M - I_A \cdot Z_{FIR}$. $V_M = V_{BEMF} + I_A \cdot Z_A$, so $v_{Actual} = V_{BEMF} = k \cdot v_{Motor}$, where k is a mechanical constant of the motor.

While adaption is ongoing a BEMF servo system may use $v_{Actual}$ as velocity feedback to be subtracted from $V_{CMD}$ because the adaption excitation is not within the bandwidth of the servo. Alternately, after adaption is completed, Switch 380 may be opened and VADP may be made zero, to allow normal servo operation either as a BEMF servo with accurately removed effects of armature impedance or a "track-following" voice coil motor (VCM) servo system in a hard disc drive. Adaption can be performed, periodically, while operating in a 'track-following' servo so the Filter 365 will be tuned properly when the servo needs to become BEMF controlled.

Thus, the temperature and other environmental factors which might affect the system 300 approximate the conditions experienced by VCM 340 during normal operation. For example, when applied to a voice coil motor (VCM) in a hard disc drive, the tickle signal may be applied periodically at any time other than during read/write operations without stopping the motor. Thus, the monitored device can be held at steady state at operating temperatures, allowing for an accurate determination of the temperature-dependent armature impedance of the VCM 340.

While FIG. 3 illustrates a FIR Filter 365, any filter that models the impedance of the motor may be used. For example, where VM depends upon the induced back EMF voltage as well as a contribution that depends upon the finite DAC history, the FIR relationship can be modeled by the relationship VC(k)=VBEMF(k)+FModel(DAC(k−1)·DAC(k−2)·DAC(k−2)·DAC(k−2) . . . DAC(k−N)). When the back EMF voltage generated is zero, for example, when the arm of the VCM is restrained or clamped or the tickle signal is applied, the FIR relationship can be simplified to relationship VC(k)=FModel(DAC(k−1)·DAC(k−2)·DAC(k−2)·DAC(k−2) . . . DAC(k−N)). The finite impulse response model FModel includes identifiable physical constants including, for example, the resistance of the VCM.

In an implementation, additional correction terms may be implemented, for example, in firmware using the digital VCM command and the analog-to-digital converter (ADC) result of a VCM voltage measurement circuit. In another implementation, a FIR model may be used in conjunction with analog compensation techniques, such as IR cancellation circuitry, which may partially cancel other contributions to the coil voltage before collecting an ADC coil voltage measurement.

The adaption engine may also adapt the filter to account for other influences on the motor, such as alternating current (AC) and direct current (DC) values of the motor driver, the impedance (Z) of the motor, and effects of other components, such as a digital to analog converter (DAC), power amplifier, or motor/positioner on the system. Some values, such as the armature impedance $Z_A$ of the motor, may be sensitive to temperature, and fluctuate. Thus, the adaption engine can account for changes in the system and adapt the filter to effectively cancel these effects. Once the filter is tuned or adapted, any difference resulting between the tuned filter voltage and the output voltage of the monitored device will be proportional to the back electromotive force (BEMF) of the monitored device.

In the implementation illustrated in FIG. 3, the error computed by error module 370 is used by adaption engine 375 to adapt the FIR Filter 365 to compensate for the impedance of the VCM 340. However, in other implementations, the filter may also be adapted to compensate for environmental factors, such as temperature, or other factors.

In yet another implementation, the parameters of the model can be identified while the VCM is in motion by using a model of the effect of the VCM command upon actuator motion. This may be accomplished, for example, by combining the identification of a dynamic model for the VCM motion with the identification of the dynamic model of back EMF sensor dynamics to create a cancellation scheme. In still another implementation, other measurements may be used to continually adjust the sensor model during operation.

Figure 4:
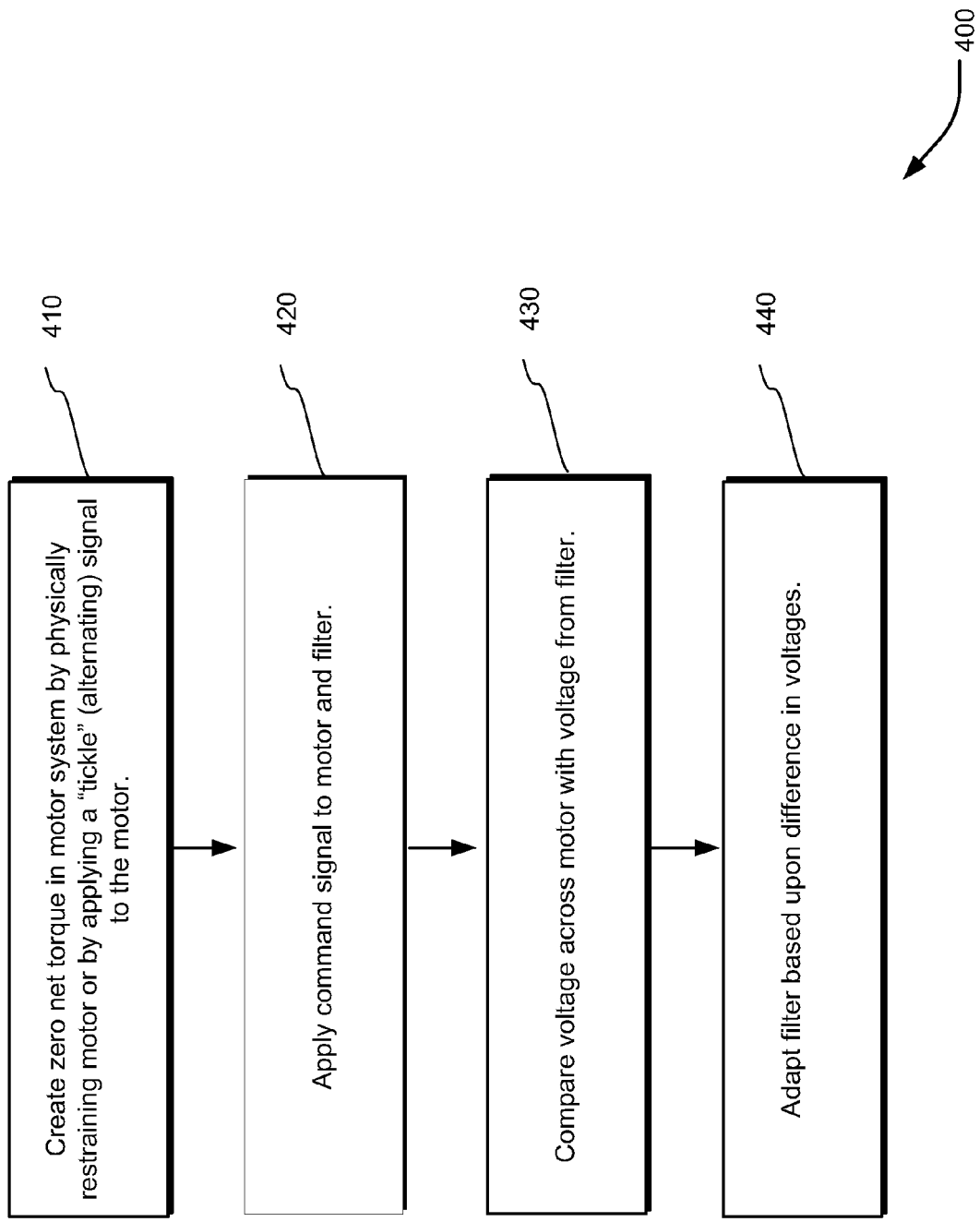
FIG. 4 is a flow chart illustrating a method for dynamically adjusting a filter.

FIG. 4 is a flow chart illustrating a method for dynamically adjusting a filter. In FIG. 4, at element 410, zero net torque is created in the motor. This can be accomplished in a variety of ways. In an implementation, the motor may be physically restrained. In a voice coil motor (VCM), for example, the arm of the VCM may be driven into an inner stop, an outer stop, or a ramp stop. In another implementation, a tickle current may be applied to the motor. The tickle current is an alternating positive and negative current signal, has low amplitude, and is high-frequency. This tickle current produces no net torque in the motor because the mechanical time constant of the motor is much lower than the electrical time constant.

At element 420, a command signal is applied to both the motor and the filter. At element 430, the resulting voltage across the motor and the resulting voltage from the filter, both of which are driven by the command signal, are compared. At element 440, the filter is dynamically adapted based on the difference between the voltage across the motor and the voltage output by the filter.

Figure 5:
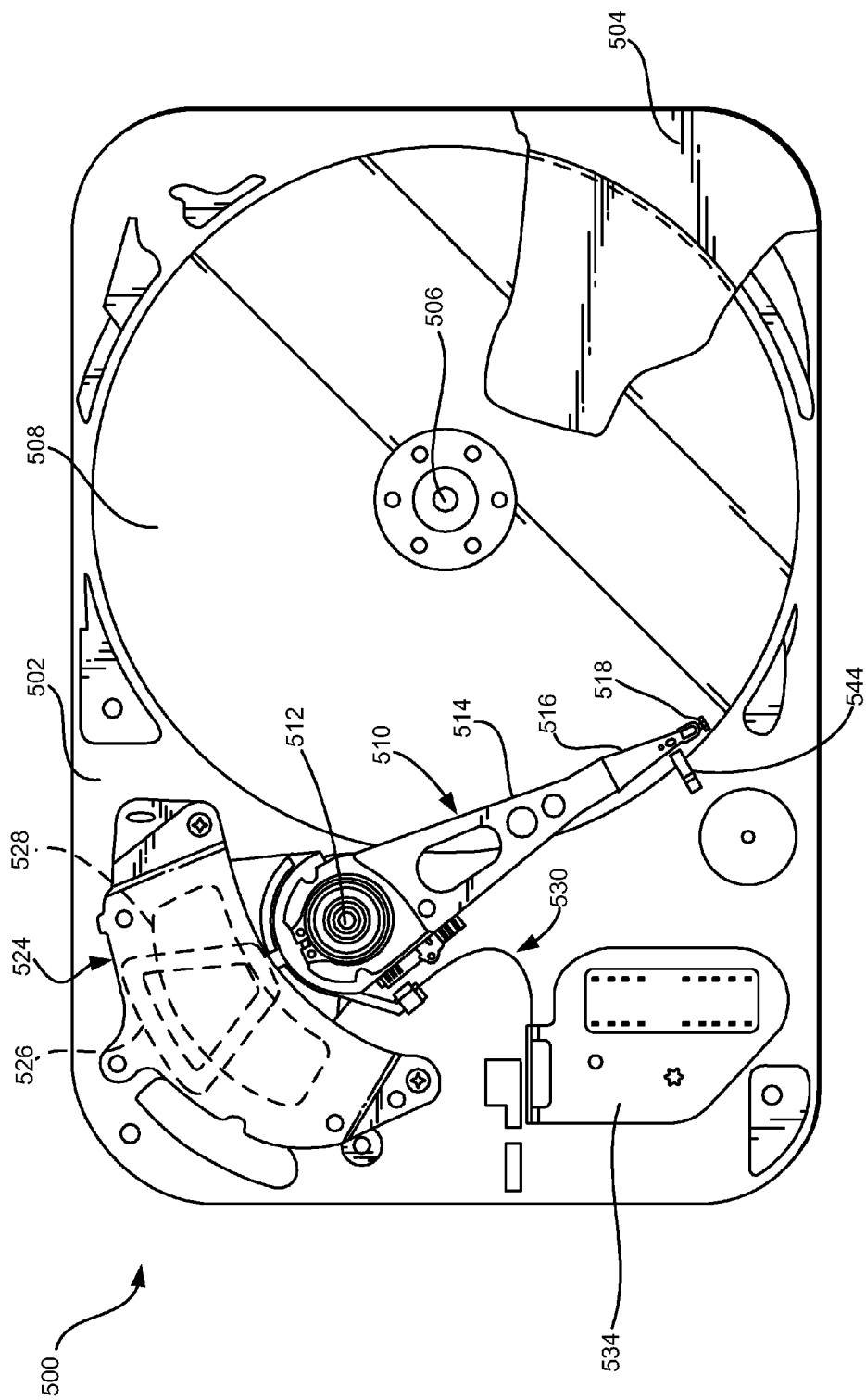
FIG. 5 illustrates a plan view of an example disc drive.
Figure 6:
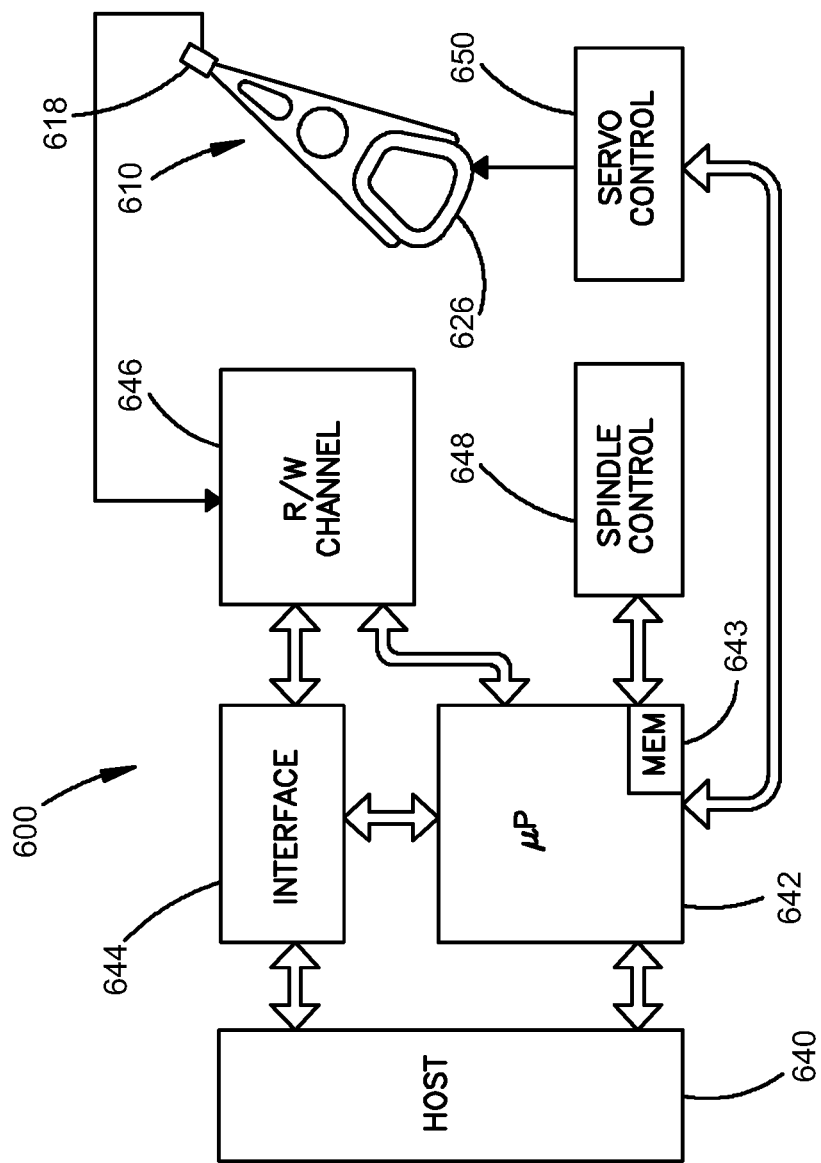
FIG. 6 illustrates the example functional components of a disc drive.

FIG. 5 illustrates a plan view of an example disc drive 500. The disc drive 500 includes a base 502 to which various components of the disc drive 500 are mounted. A top cover 504, shown partially cut away, cooperates with the base 502 to form an internal, sealed environment for the disc drive in a conventional manner. The components include a spindle motor 506 which rotates one or more storage medium discs 508 at a constant high speed. Information is written to and read from tracks on the discs through the use of an actuator assembly 510, which rotates during a seek operation about a bearing shaft assembly 512 positioned adjacent to the discs 508. The actuator assembly 510 includes a plurality of actuator arms 514 which extend towards the discs 508, with one or more flexures 516 extending from each of the actuator arms 514. Mounted at the distal end of each of the flexures 516 is a head 518 which includes an air bearing slider enabling the head 518 to fly in close proximity above the corresponding surface of the associated disc 508.

During a seek operation, the track position of the head 518 is controlled through the use of a voice coil motor (VCM) 524, which typically includes a coil 526 attached to the actuator assembly 510, as well as one or more permanent magnets 528 which establish a magnetic field in which the coil 526 is immersed. The controlled application of current to the coil 526 causes magnetic interaction between the permanent magnets 528 and the coil 526 so that the coil 526 moves in accordance with the well-known Lorentz relationship. As the coil 526 moves, the actuator assembly 510 pivots about the bearing shaft assembly 512, and the heads 518 are caused to move across the surfaces of the discs 508. During a seek operation, the microprocessor 642 receives information regarding the velocity of the head 618, and uses that information in conjunction with a velocity profile stored in memory 643 to communicate with the servo control circuit 650, which will apply a controlled amount of current to the voice coil motor 626, thereby causing the actuator assembly 610 to be pivoted.

The spindle motor 506 and the voice coil servo are typically commanded to de-energize when sensing power loss. The heads 518 are moved away from portions of the disc 508 containing data and the heads 518 are secured over portions of the disc not containing data through the use of an actuator latch arrangement and/or ramp assembly 544, which prevents inadvertent rotation of the actuator assembly 510 with the drive discs 508 are not spinning. The BEMF servo with adapted filter described previous will be used for an accurate controlled velocity retract in moving the heads off the data surface.

Embodiments of the described technology have been discussed herein with reference to a magnetic disc drive. One skilled in the art will recognize that the described technology may also be applied to any data storage device, such as an optical disc drive, a magneto-optical disc drive, or a compact disc drive, having a DC motor. Further, one skilled in the art will understand that various implementations of the described technology are equally applicable to any type of electrical or electronic device capable of controlling a DC motor. For example, devices that may implement embodiments of the present invention include but are not limited to notebook computers, handheld devices such as Personal Digital Assistants (PDAs), cell phones, office equipment such as copiers and fax machines, woodworking and metalworking systems, transit vehicles, automobiles, other transportation systems, etc.

The above specification, examples and data provide a complete description of the structure and use of exemplary implementations of the invention. Although various implementations of the invention have been described above with a certain degree of particularity, or with reference to one or more individual implementations, those skilled in the art could make numerous alterations to the disclosed embodiments without departing from the spirit or scope of this invention. In particular, it should be understood that the described technology may be employed independent of a personal computer. Other implementations are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:
   dynamically adjusting a filter representing a complex impedance of a motor system while applying a zero mean excitation signal to the motor system.

2. A method according to claim 1, wherein the filter is dynamically adjusted based on a deviation between a voltage across a monitored device and a voltage output by the filter.

3. A method according to claim 2, wherein the monitored device is a DC motor.

4. A method according to claim 1, wherein applying the zero mean excitation signal creates no net torque in the motor system.

5. A method according to claim 1, wherein the amplitude of the zero mean excitation signal is insufficient to cause motor motion.

6. A method according to claim 1, wherein the frequency of the zero mean excitation signal is insufficient to cause motor motion.

7. A method according to claim 1, wherein the filter is a finite impulse response filter.

8. A method according to claim 7, wherein the finite impulse response filter is adapted based on one or more environmental conditions.

9. A method according to claim 1, further comprising:
modeling the motor system while the motor system is in motion, and
using the modeled motor system to cancel the effects of modeled motor when dynamically adjusting the filter.

10. A method according to claim 1, wherein the motor system is a voice coil motor.

11. A system comprising:
a motor system; and
a filter representing a complex impedance of the motor system, the filter being dynamically adapted while a zero mean excitation signal is applied to the motor system.

12. A system according to claim 11, further comprising:
an adaption engine that dynamically adapts the filter.

13. A system according to claim 11, wherein the filter is a finite impulse response filter.

14. A system according to claim 12, wherein the adaption engine dynamically adapts the filter in response to changes in environmental conditions.

15. A system according to claim 11, wherein the motor system includes a voice coil motor.

16. A system according to claim 11, wherein the filter is dynamically adjusted based on a deviation between a voltage across a monitored device and a voltage output by the filter.

17. A method comprising:
applying a zero mean excitation signal to a motor system, wherein the zero mean excitation signal creates no net torque in the motor system.

18. A method according to claim 17, wherein the zero mean excitation is a low amplitude alternating current.

19. A method according to claim 17, wherein the zero mean excitation is a high-frequency alternating current.

20. A method according to claim 17, further comprising adjusting a filter representing a complex impedance of the motor system.

* * * * *